Dec. 14, 1948.  G. E. PETERS ET AL  2,455,946
PUMP
Filed Oct. 20, 1944
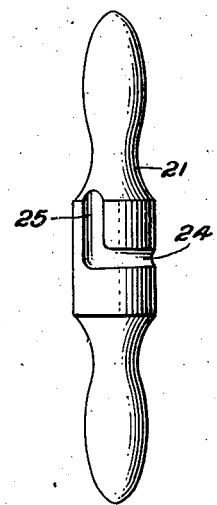
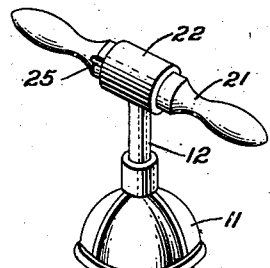
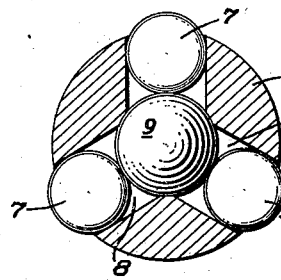
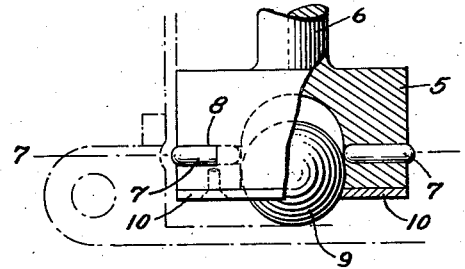
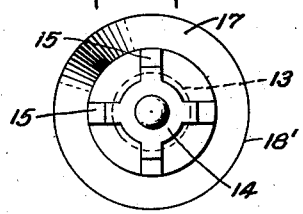
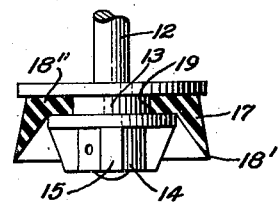
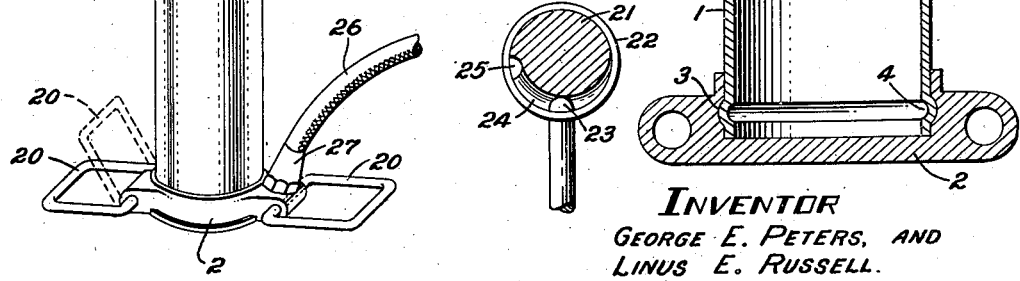
INVENTOR
GEORGE E. PETERS, AND
LINUS E. RUSSELL.
By Tom Walker
ATTORNEY Patented Dec. 14, 1948

2,455,946

UNITED STATES PATENT OFFICE 2,455,946

PUMP

George E. Peters and Linus E. Russell, Springfield, Ohio, assignors to Peters & Russell, Inc., Springfield, Ohio, a corporation of Ohio Application October 20, 1944, Serial No. 559,537

2 Claims. (Cl. 230—190)

1

This invention pertains to hand operated air pumps or compressors, and particularly to a tire pump for inflating pneumatic tires and the method of manufacture thereof.

To meet the requirements of the motoring public, such pump must be of light weight, but of sturdy construction and capable of being economically manufactured and assembled to enable it to be sold at a minimum price.

The object of the invention is to improve the construction as well as the means and mode of manufacture of hand operated tire pumps, whereby they may not only be economically manufactured, but will be strong and sturdy, of compact form, capable of withstanding rough usage, of light weight, having but few parts, and be unlikely to get out of repair.

A further object of the invention is to provide an improved method of assembling the barrel and base of the pump by rolling or expanding the barrel in the base to effect a leak-tight secure joint, unlikely to become loose, without the use of screw threads.

A further object of the invention is to provide a detachable cross arm for the handle shaft which may be securely locked in position but readily detachable for convenient storage.

A further object of the invention is to provide an improved piston cup gasket and mounting therefor.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein is illustrated the preferred but not necessarily the only form of embodiment of the invention, Fig. 1 is a perspective view of a hand operated tire pump embodying the present invention.

Fig. 2 is a detail sectional view of the connection of the barrel with the base.

Fig. 3 is a detail sectional view of the piston illustrating the cup gasket and its mounting.

Fig. 4 is an end view of the piston.

Fig. 5 is a sectional view of the handle shaft cross arm illustrating the detachable locking feature.

Fig. 6 is a side elevation of the handle cross arm detached from the pump.

Fig. 7 is a transverse sectional view of the expanding mandrel for rolling the barrel into interlocking engagement with the base on line 7—7 of Fig. 8.

Fig. 8 is a side elevation, partly in section, of the expanding mandrel for interlocking the barrel with the base of the pump.

Like parts are indicated by similar characters of reference throughout the several views.

Referring to the accompanying drawings, the pump includes a barrel 1, which for economy of production and to minimize weight is constructed of a section of relatively light gage commercial tubing, the lower end of which is seated in a socket formed in a base member 2. The interior side walls of the socket are grooved at 3, and the inserted portion of the tubular barrel is expanded to form a bead 4 conforming to the groove 3.

The preferable method of locally expanding or beading the end of the barrel 1 is by rotation within the barrel of a tool, such as illustrated in Figs. 7 and 8. A head 5 carried on a revoluble shaft or stem 6 is provided with a series of rotary, round edges discs 7, which protrude somewhat through spaced slots 8 intersecting the periphery of the head 5. The discs 7 are free within the slots 8 of the head for both rotary and radial movement, but cannot escape because their diameters are slightly greater than the mouths of the slots through which segments of the roller discs 7 protrude. Concentrically positioned within the rotary head 5 is a large bearing ball 9 which bears upon inner margins of the roller discs and is vertically movable under pressure to exert camming action on the roller discs 7. The ball 9 projects somewhat from the bottom of the head 5, in which it is retained by a perforated plate 10. The tool being inserted into the barrel is rotated while under pressure. The ball 9 engaging with the bottom of the base 2 is forced upwardly against the yielding resistance of the roller discs 7 which are thereby pressed radially against the interior of the barrel 1 in registry with the internal groove 3 of the base. By rotating the tool relative to the barrel 1, the wall of the latter is swedged into the groove 3, thus forming the interlocking bead 4 which is thus tightly seated within the base 2 in leak-tight relation.

At the top of the barrel 1 is a head 11 detachably engageable with the barrel 1, preferably by a mutilated thread or other quick releasable connection.

Reciprocating within the barrel 1 is a piston rod 12, having a sliding bearing in the cylinder or barrel head 11. Secured to the rod or stem 12 is a piston head, comprising a peripherally grooved collar 13, provided with an integral hub 14, from which project peripherally spaced tapered ribs 15. The hub is cut away to form the ribs 15 merely to reduce weight, and facilitate manufacture. The piston head is fixedly secured upon the end of the stem or rod 13 by staking the hub thereto, as indicated at 16, or by riveting the end of the stem or rod beyond the piston head. A cup-shaped gasket 17 having a dependent skirt 18' and a thickened annular top flange 18" is engaged in the peripheral groove 19 of the collar 13. The gasket may be of leather or rubber, but is preferably of an artificial rubber substitute, of which there are several suitable varieties now available upon the market.

It is frequently desirable to store a tire pump in a restricted space, which many times is the only available place to receive it. To enable adjustment into a most compact form, lateral loop extensions 20 are hinged to the base 2, upon which the operator may place his feet to hold the pump while in use. When not being used the extensions 20 may be folded to retracted relation, as shown by dotted lines in Fig. 1.

The cross arm handle of the ordinary tire pump interferes with its storage within a restricted space. In the present instance the cross arm 21 is detachable and the outer end of the stem or piston rod is an annular head 22, into which the upper end of the rod projects a short distance, as at 23. The cross arm 21 is provided with a peripheral groove 24 of progressive depth which is intersected at its deeper end by a longitudinal groove 25. The handle 21 is thrust through the annular head 22 in such position that the protruding end of the stem 12 enters the longitudinal groove 25 until it passes thence into the peripheral groove 24. A partial rotation of the handle 21 moves the entering groove 25 out of registry with the protruding end 23 of the rod within the annular head, and further rotation of the handle causes camming action of the progressively shallow portion of the groove 24 to tightly bind upon the end 23 of the stem.

In practice the detachable handle will be connected with the pump stem or rod by a light chain or cord to prevent misplacement. The outlet or discharge conduit 26 communicates with the interior of the pump barrel through the base 2, and is preferably provided with a check valve 27.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. An air and gas hand pump, including a tubular barrel, a reciprocatory piston therein, a manually operable piston rod, an annular head on the piston rod, a projection upon the inner wall of the annular head, a cross arm insertable through the annular head and capable of limited rotary motion therein, a peripheral cam groove of progressively varying depth in the cross arm within which the projection engages upon insertion of the cross arm into the head and wherein it is tightened upon subsequent partial rotation of the cross arm about its longitudinal axis.

2. In a hand-operated air or gas pump, a cylinder, a reciprocatory piston mounted therein, a piston rod connected at one end to the piston, an annular member rigidly connected adjacent the opposite free end of the piston rod and into which the free end of said rod extends, and an elongated cylindrical handle member having an intermediate right-angle groove formed in the periphery thereof, said groove being of progressively decreasing depth from its outer end toward its inner terminal end, whereby when the handle is moved through the annular member the free end of the piston rod will enter the groove and will be frictionally engaged by the walls defining the latter when the handle is rotated about its longitudinal axis.

GEORGE E. PETERS.
LINUS E. RUSSELL.

REFERENCES CITED

The following references are of record in the file of this patent:

UNITED STATES PATENTS

| Number | Name | Date |
|---|---|---|
| 623,662 | Goss | Apr. 25, 1899 |
| 1,025,221 | Virtue | May 7, 1912 |
| 1,029,232 | Schaefer et al. | June 11, 1912 |
| 1,108,903 | Hancock | Sept. 1, 1914 |
| 1,139,930 | Tyler | May 18, 1915 |
| 1,357,544 | Culp | Nov. 2, 1920 |
| 1,412,279 | Eslinger | Apr. 11, 1922 |
| 1,441,829 | Brandt | Jan. 9, 1923 |
| 2,209,181 | Wendel | July 23, 1940 |

FOREIGN PATENTS

| Number | Country | Date |
|---|---|---|
| 505,677 | Great Britain | 1939 |